United States Patent
Hosoe et al.

(10) Patent No.: US 6,674,468 B1
(45) Date of Patent: Jan. 6, 2004

(54) IMAGE RECORDING APPARATUS AND METHOD FOR SELECTIVE PROHIBITION OF ERASURE DURING RECORDING

(75) Inventors: Hiroshi Hosoe, Yokohama (JP); Kyoji Tamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/181,038

(22) Filed: Oct. 28, 1998

(30) Foreign Application Priority Data

Oct. 31, 1997 (JP) .............................................. 9-315930
Sep. 29, 1998 (JP) ........................................... 10-275232

(51) Int. Cl.⁷ ................................................ H04N 5/76
(52) U.S. Cl. .............................. 348/231.6; 348/333.02; 348/333.05; 348/333.11
(58) Field of Search ....................... 348/231.99, 333.01, 348/333.11, 333.02, 333.05; 386/121; 358/909.1, 906

(56) References Cited

U.S. PATENT DOCUMENTS

| | | | | |
|---|---|---|---|---|
| 5,226,145 A | * | 7/1993 | Moronaga et al. | 348/231 |
| 5,287,187 A | | 2/1994 | Sato et al. | 348/595 |
| 5,335,072 A | * | 8/1994 | Tanaka et al. | 348/232 |
| 5,523,799 A | * | 6/1996 | Hattori et al. | 348/715 |
| 5,534,921 A | * | 7/1996 | Sawanobori | 348/231 |
| 5,956,083 A | * | 9/1999 | Taylor et al. | 348/231 |
| 6,147,708 A | * | 11/2000 | Suzuki et al. | 348/232 |
| 6,377,294 B2 | * | 4/2002 | Toyofuku et al. | 348/36 |
| 6,549,232 B1 | * | 4/2003 | Taniguchi et al. | 348/231.99 |
| 2001/0017657 A1 | * | 8/2001 | Kowno et al. | 348/231 |
| 2002/0085101 A1 | * | 7/2002 | Kowno et al. | 348/231 |

* cited by examiner

Primary Examiner—Wendy R. Garber
Assistant Examiner—Jason Whipkey
(74) Attorney, Agent, or Firm—Fitzpatrick, Cella, Harper & Scinto

(57) ABSTRACT

In an image recording apparatus and method, when photographing images and recording the photographed images in a recording medium, by arranging so as to perform a plurality of different kinds of retrieval operations for the images recorded in the recording medium in accordance with respective operational modes of the apparatus, it is possible to promptly retrieve unnecessary recorded data during a photographing operation of recording moving images in a randomly accessible recording medium.

17 Claims, 12 Drawing Sheets

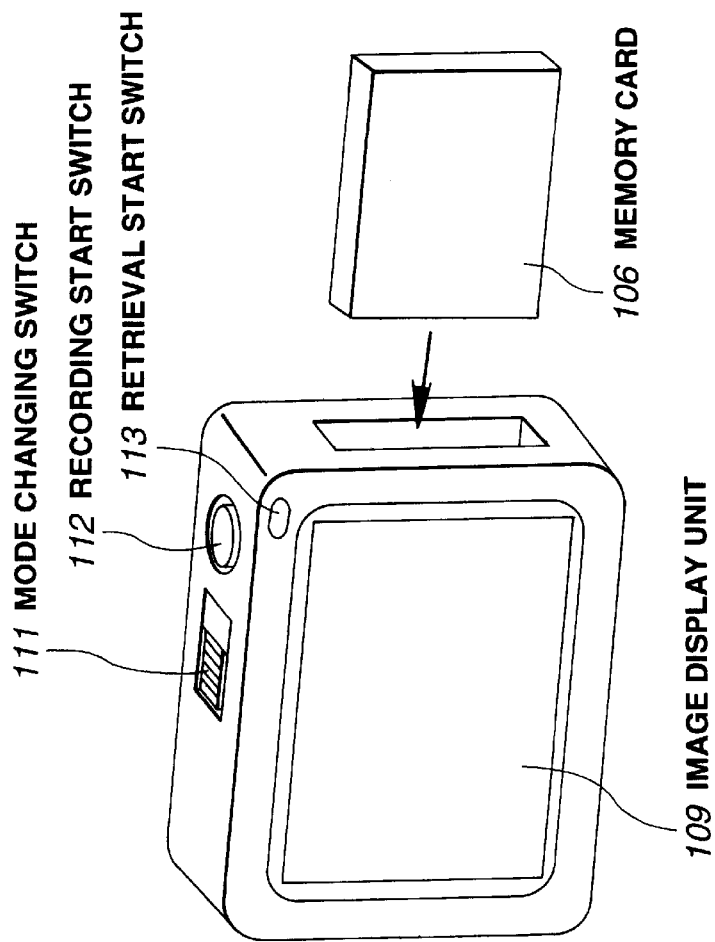
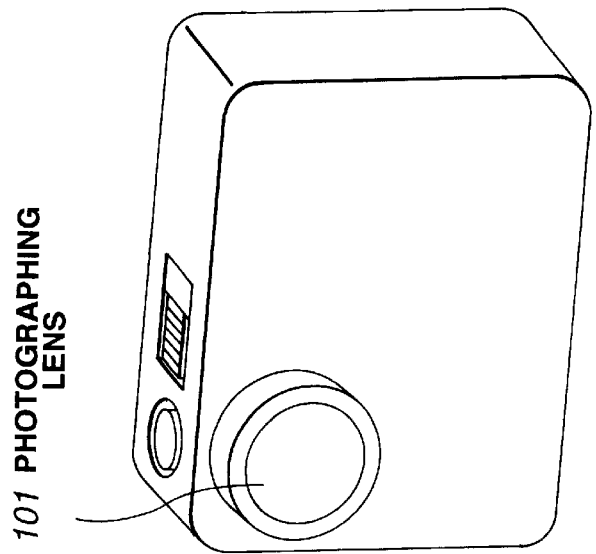
FIG.6

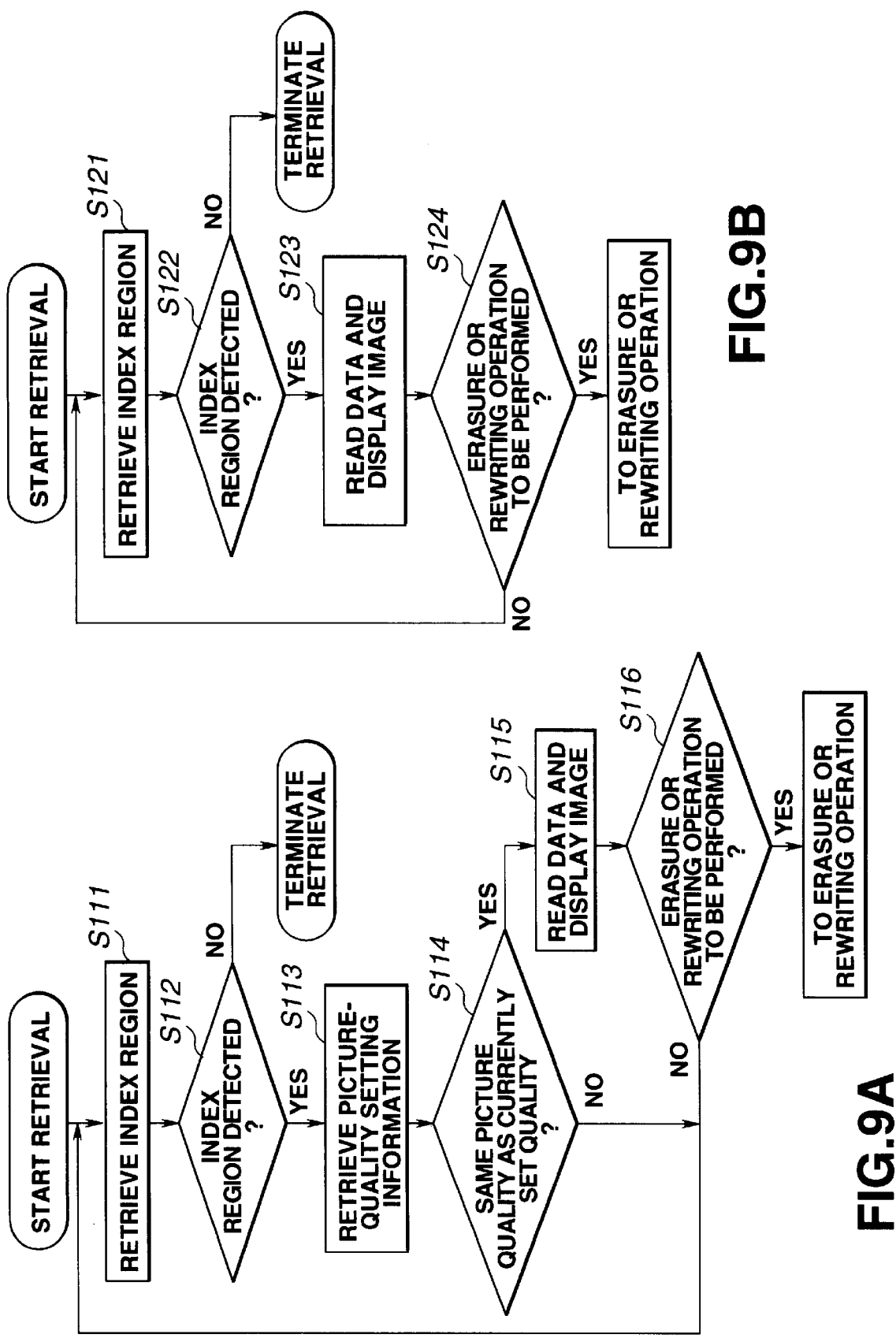

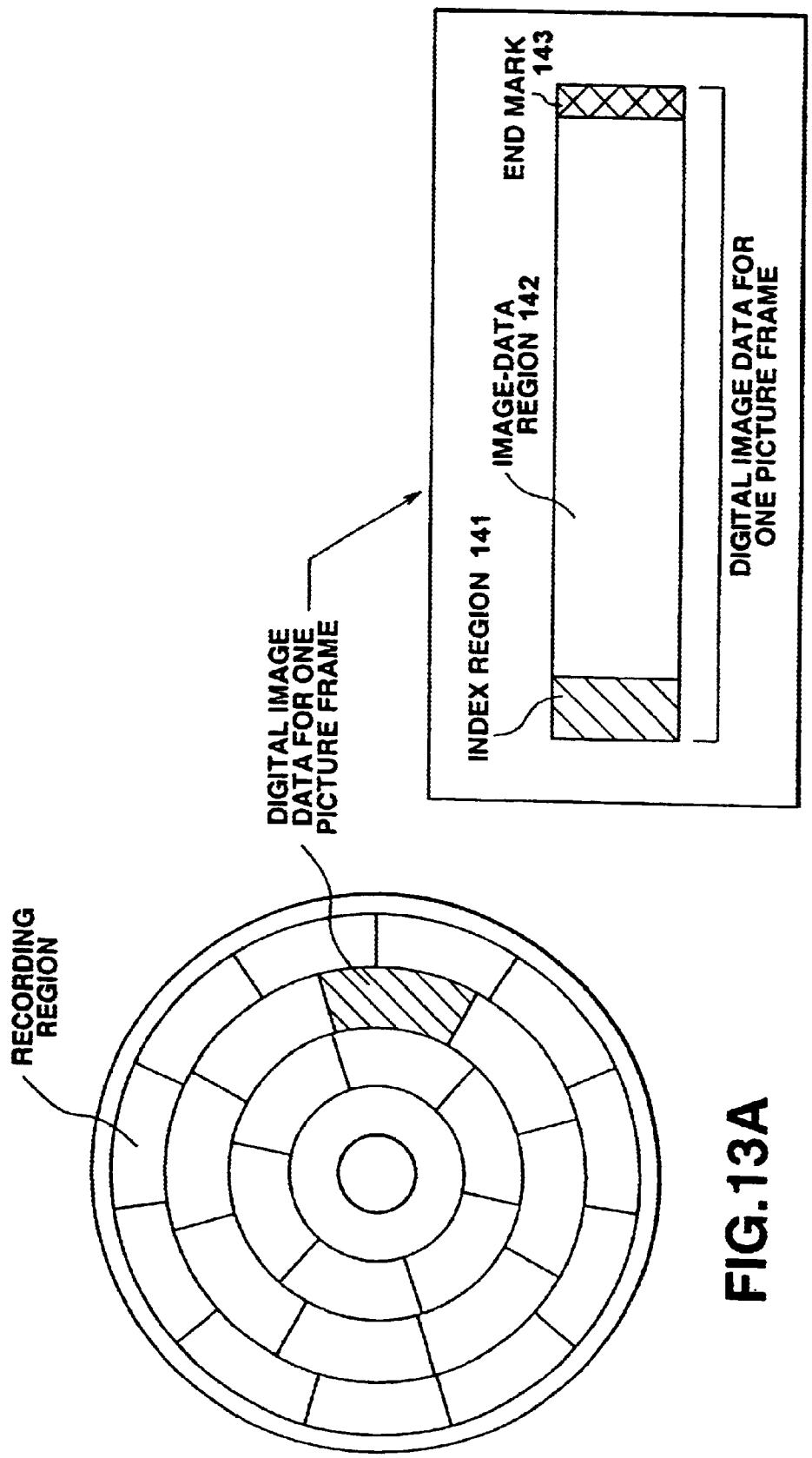

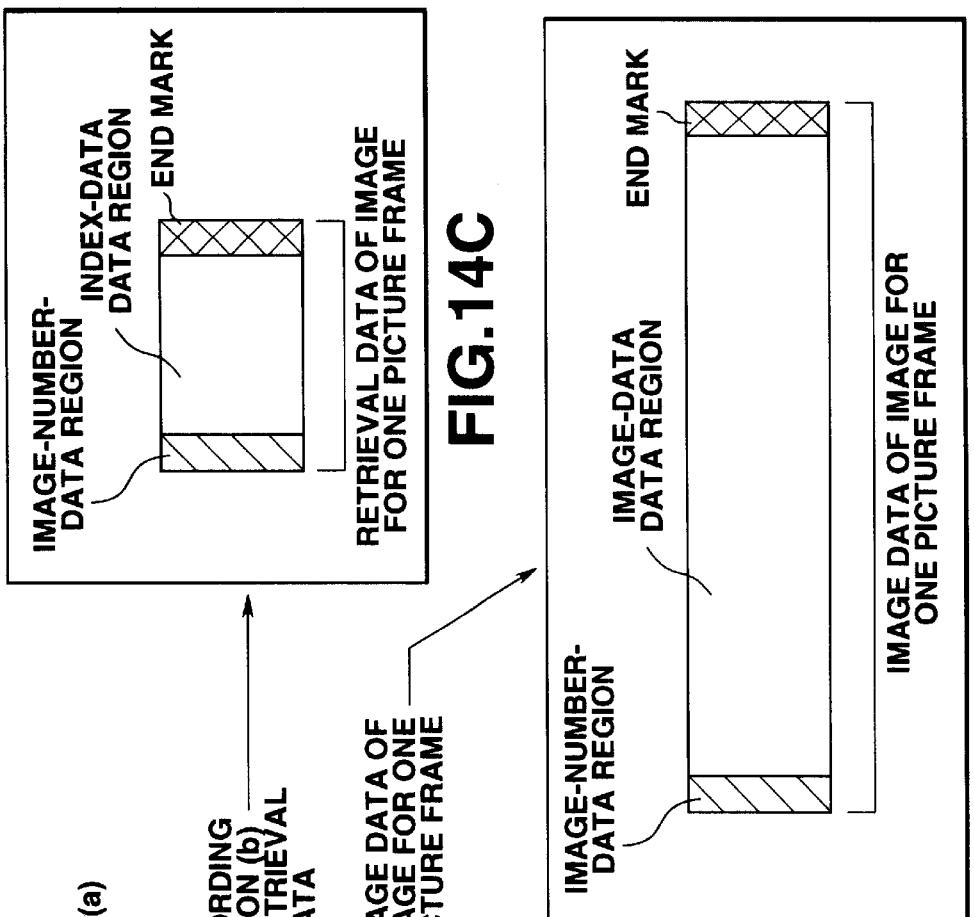
FIG.14C
FIG.14B
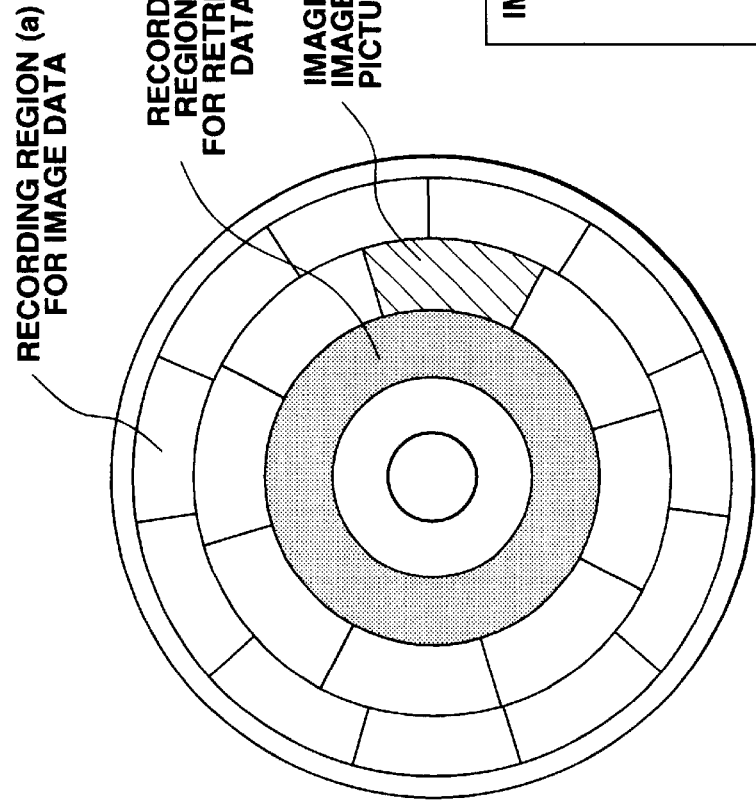
FIG.14A

IMAGE RECORDING APPARATUS AND METHOD FOR SELECTIVE PROHIBITION OF ERASURE DURING RECORDING

BACKGROUND OF THE INVENTION

1. Field of the Invention

The present invention relates to an image recording apparatus and method.

2. Description of the Related Art

As a result of recent extensive distribution of personal computers to ordinary homes in the multimedia technology, there is an increasing demand to digitally record images and voice. By recording images as digital data, compatibility with computers is improved to allow easy processing/editing of data by the user.

Under such circumstances, digital still cameras and digital camcorders are known as means for digitally recording images. A semiconductor memory, a disk device, such as a floppy disk or the like, a magnetic tape or the like is used as a recording medium for such an apparatus.

Although randomly accessible recording media, such as semiconductor memories, floppy disks and the like, are not suitable for recording moving images because of some problems, such as the recording capacity and the like, these media are frequently used for recording still images because of excellent data retrievability. At present, magnetic tapes which can provide a larger recording capacity with a lower cost than semiconductor memories and the like are mainly used for recording moving images having a larger amount of data than still images.

On the other hand, from the viewpoint of data retrievability, and compatibility with computers, recording of moving images in randomly accessible recording media, such as semiconductor memories and the like, is being attempted.

However, when recording moving images in a randomly accessible recording medium, it is difficult to perform a long-time photographing operation of moving images without performing any additional processing because of the above-described problem of the recording capacity. Accordingly, it is necessary to perform a photographing operation after securing a recordable vacant capacity by erasing recorded data or transferring data to another large-capacity recording device, such as a hard disk or the like.

At that time, the user must select data, for example, by reproducing recorded images and confirming the contents thereof. Hence, excellent operability of data retrieval is required. Particularly, when the recording capacity becomes insufficient during a photographing operation and unnecessary recorded data must be urgently erased, an appropriate photographing time may not be provided unless data to be erased can be promptly discriminated from data to be preserved, resulting in inconvenience to the user.

Conventionally, image recording/reproducing apparatuses, such as video cameras and digital cameras, are known as means for photographing images of an object and recording the photographed images in a recording medium, such as a magnetic tape, a semiconductor memory, a magnetic disk, an optical disk or the like. In contrast to silver-halide cameras, these image recording/reproducing apparatuses include image display means, such as liquid-crystal displays or the like, so that it is possible to confirm an image being photographed using the image display means, immediately confirm the contents of a photographed image at the place of the photographed operation, reproduce a recorded image and confirm the contents of the image, select an unnecessary image from among recorded images, and easily erase the selected image at the place of the reproducing operation.

As a result of recent technical innovation, the recording capacities of recording media, such as semiconductor memories, optical disks and the like, which are used in the above-described image recording/reproducing apparatuses as recording media tend to increase, so that the number of recordable images is increasing.

On the other hand, since these recording media are still expensive, the recording media are repeatedly used by transferring images recorded in the recording media to another large-capacity recording media, such as hard disks or the like, and then erasing the images recorded in the media, instead of preserving the photographed images in the recording media.

However, as the recording capacity of such a recording medium increases, an operation of retrieving a desired image from among a large number of recorded images becomes troublesome.

Particularly, when the recording capacity of a recording medium becomes insufficient during a photographing operation and it is necessary to erase images from among recorded images in order to secure a recording capacity for photographing new images, a photographing time may not be provided unless prompt retrieval can be performed in order to discriminate images to be erased from images to be preserved. Furthermore, when transferring images to be preserved to another large-capacity recording medium by selecting the images from among images recorded in the recording medium while confirming the contents of each image, prompt image retrieval and confirmation cannot be performed conventionally, a very troublesome operation for the user.

SUMMARY OF THE INVENTION

It is an object of the present invention to provide an image recording apparatus and method which can solve the above-described problems.

It is another object of the present invention to provide an image recording apparatus and method which can promptly retrieve unnecessary recorded data during a photographing operation of recording moving images in a randomly accessible recording medium.

It it still another object of the present invention to provide an image recording apparatus and method which has an image retrieval function with an excellent operability so as to promptly retrieve a desired image from among recorded images depending on a state of use of the apparatus.

According to one aspect, the present invention which achieves these objectives relates to an image recording apparatus for photographing images and recording the photographed images in a recording medium. The apparatus includes image pickup means for picking up images, image recording means for recording the images picked up by the image pickup means in a recording medium, and retrieval means for performing a plurality of kinds of different retrieval operations in accordance with operational modes of the apparatus for the images recorded in the recording medium by the image recording means.

According to another aspect, the present invention which achieves these objectives relates to an image recording method for photographing images and recording the photographed images in a recording medium. The method includes an operational-mode setting step of setting an operational mode of an image recording apparatus, and a retrieval step of performing different retrieval operations in accordance with the operational mode set in the operational-mode setting step, when retrieving images recorded in a recording medium.

According to still another aspect, the present invention which achieves these objectives relates to an image recording apparatus for photographing images and recording the photographed images in a recording medium. The apparatus includes image pickup means for picking up images, image recording means for recording the images picked up by the image pickup means in a recording medium, and retrieval means, having a plurality of different kinds of retrieval conditions corresponding to respective operational modes of the apparatus, for selecting one of the plurality of different kinds of retrieval conditions in accordance with an operational mode of the apparatus and for retrieving images recorded by the image recording means in accordance with the selected retrieval condition.

According to yet another aspect, the present invention which achieves these objectives relates to an image recording method for photographing images and recording the photographed images in a recording medium. The method includes a selection step, having a plurality of different kinds of retrieval conditions corresponding to respective operational modes of an image recording apparatus, of selecting one of the plurality of different kinds of retrieval conditions in accordance with an operational mode of the apparatus, and a retrieval step of allowing to retrieve images recorded in a recording medium in accordance with the retrieval condition selected in the selection step.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 6 is a schematic diagram illustrating a digital camera, serving as an image recording/reproducing apparatus according to a second embodiment of the present invention;

FIGS. 9A and 9B are flowcharts, each illustrating an image retrieval operation in the second embodiment;

FIGS. 13A and 13B are diagrams illustrating a data recording pattern and a data-string format, respectively, of an optical disk; and FIGS. 14A, and 14B and 14C are diagrams illustrating another examples of a data recording pattern and data-string formats, respectively, of an optical disk.

DETAILED DESCRIPTION OF THE PREFERRED EMBODIMENTS

Figure 1:
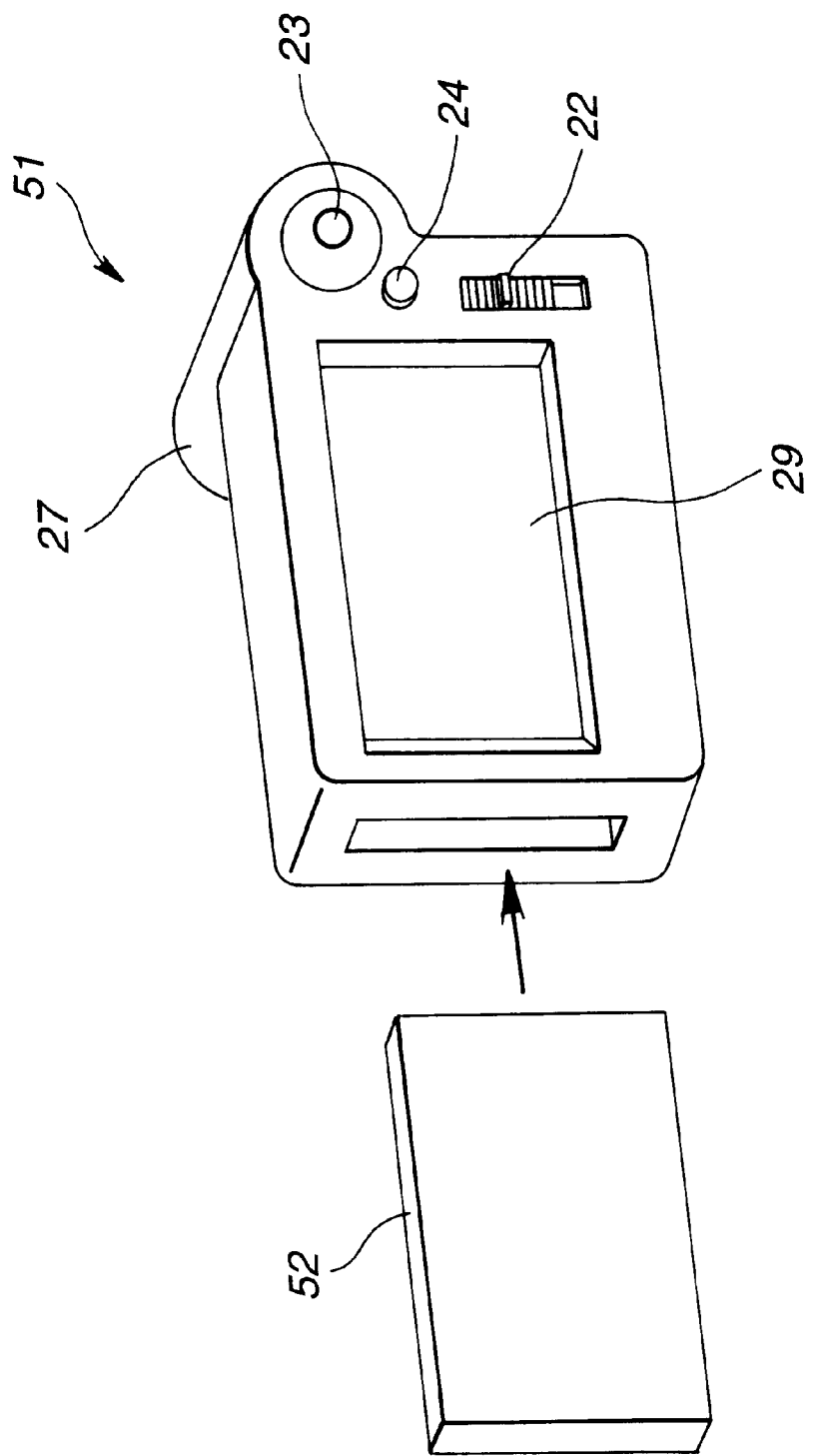
FIG. 1 is a perspective view illustrating an external appearance of an image recording apparatus according to a first embodiment of the present invention.

An image recording apparatus and method according to a first embodiment of the present invention will now be described with reference to the drawings. FIG. 1 is a perspective view illustrating an external appearance of an image recording apparatus according to the first embodiment. An image recording apparatus 51 includes a camera unit 27 for photographing images, and a liquid-crystal monitor 29 for displaying a photographed image, and uses a semiconductor memory (hereinafter abbreviated as a "memory") as a recording medium. The memory is accommodated within a PC (personal computer) card 52, which is detachably mountable in the main body of the image recording apparatus 51. A recording start switch 23, a search switch 24 and a mode changing switch 22 are provided at the back of the main body.

Figure 2:
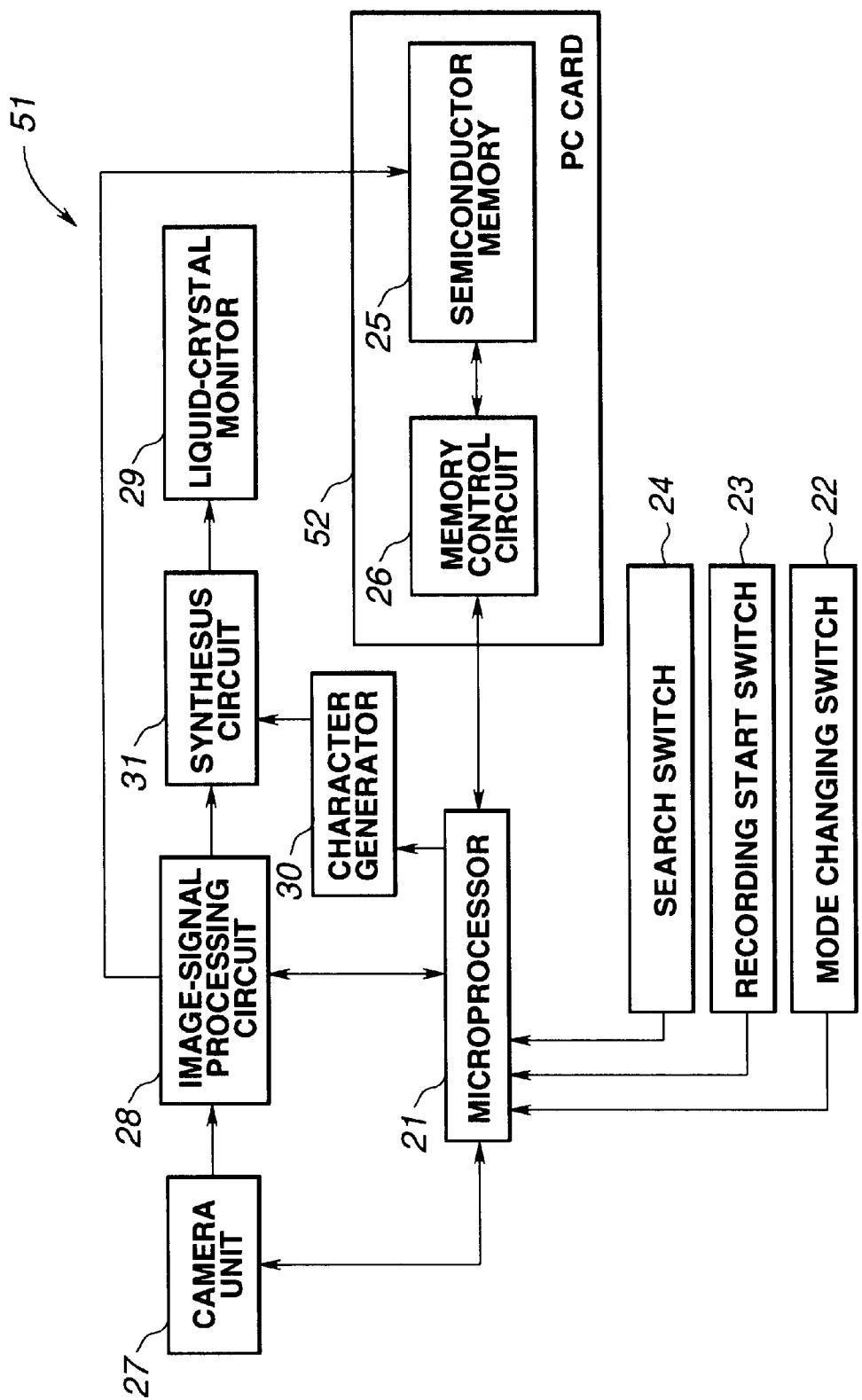
FIG. 2 is a block diagram illustrating the electric configuration of the image recording apparatus shown in FIG. 1.

FIG. 2 is a block diagram illustrating the electric configuration of the image recording apparatus 51. The image recording apparatus 51 includes an image-signal processing circuit 28, a character generator 30, a synthesis circuit 31 and the like around a microprocessor 21.

The microprocessor 21 controls the entire apparatus, i.e., monitors input signals from operational switches (the mode changing switch 22, the recording start switch 23 and the search switch. 24) and controls each of various operations, such as switching of the operational mode, start/stop of recording, search and the like, in accordance with the user's switch operation. Furthermore, the microprocessor 21 always monitors a state of recording of a memory 25 by communicating with a memory control circuit 26, accommodated within the PC card 52, for controlling the memory 25.

The image recording apparatus 51 has two operational modes, i.e., a photographing mode of recording images photographed by the camera unit 27 in the memory 25, and a reproducing mode of reproducing an image recorded in the memory 25 and displaying the reproduced image on the liquid-crystal monitor 29. These operational modes can be changed by the user through the mode changing switch 22.

In the photographing mode, an image photographed by the camera unit 27 is displayed on the liquid-crystal monitor 29 after being processed by the image-signal processing circuit 28, and is recorded in the memory 25 in accordance with the user's operation of the recording start switch 23. In the reproducing mode, the microprocessor 21 reads image data from the memory 25 and displays the corresponding image on the liquid-crystal monitor 29.

A search operation is an operation of retrieving an image recorded in the memory 25 and displaying the retrieved image on the liquid-crystal monitor 29, and can be operated in either the photographing mode or the reproducing mode.

Every time the user operates the search switch 24, the image recording apparatus 51 sequentially searches image data recorded in the memory 25 starting from the head of the data and reproduces the retrieved image data.

Figure 3:
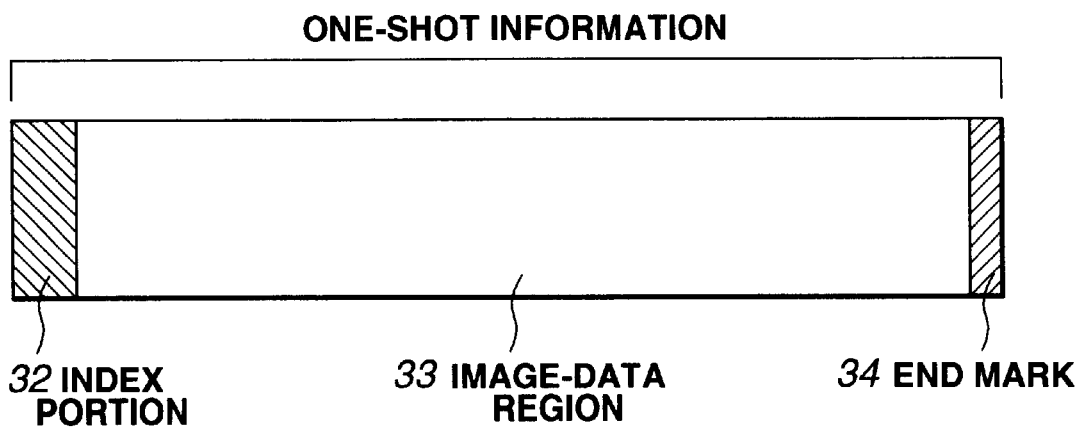
FIG. 3 is a diagram illustrating the configuration of image data.

FIG. 3 is a diagram illustrating the configuration of image data. Image data recorded in the memory 25 comprises an index portion 32, an image-data region 33, and an end mark 34 indicating the end of the image-data region 33, which constitute image data for one shot.

The one-shot image data is a series of photographed image data from the start of recording by the user's operation of the recording start switch 23 to the end of the recording by the user's second operation of the recording start switch 23. The index portion 32 is a data region which stores information relating to image data, and includes image-data protection information where permission/prohibition of erasure of the image data is set, information relating to the recording time, and the like.

In response to the user's first operation to start recording, the image recording apparatus 51 records information relating to the recording time and the like in the index portion 32 within the memory 25, and then starts recording of photographed-image data. The image recording apparatus 51 continuously records photographed images until the user then operates the recording start switch 23. Upon the user's second operation of the recording start switch 23, the recording apparatus 51 stops the recording of image data, and records the end mark 34 indicating the end of recorded images next to the image data in the memory 25.

Thus, image data for one shot is recorded in the memory 25. Accordingly, the microprocessor 21 can recognize recorded images for each shot by retrieving the index portion 32.

Figure 4:
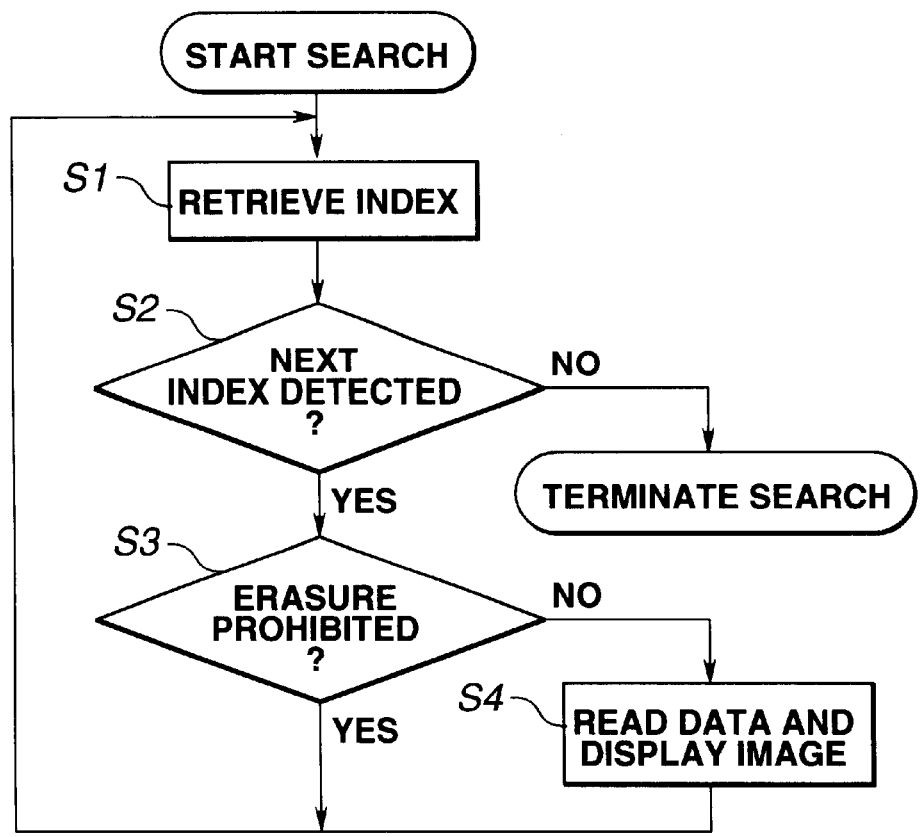
FIG. 4 is a flowchart illustrating searching operation procedures in a photographing mode in the image recording apparatus shown in FIG. 1.

FIG. 4 is a flowchart illustrating searching operation procedures in the photographing mode in the image recording apparatus 51. The processing program for these procedures is stored in a ROM (read-only memory) within the microprocessor 21, and is executed by the microprocessor 21.

In a searching operation in the photographing mode, an index portion 32 is first retrieved (step S1). It is then determined if an index portion 32 has been found as the result of the retrieval (step S2). For the first index portion 32 which has been found, the microprocessor 21 determines if erasure of the corresponding image is prohibited by referring to information stored in the index portion 32 (step S3).

If the result of the determination in step S3 is negative, image data is read and the corresponding image is displayed on the liquid-crystal monitor 29 (step S4). On the other hand, if the result of the determination in step S3 is affirmative, the process returns to step S1 without reading image data, and the next index portion 32 is retrieved.

When the next index portion 32 has been found, information stored in the index portion 32 is checked in the above-described manner, and the above-described processing in accordance with whether or not erasure of image data is prohibited is performed. When the next index portion 32 has not been found, the searching operation is terminated.

By thus performing a searching operation in order to secure a recording capacity for the user during a photographing operation, images for which erasure is prohibited are not displayed, and only images which may be erased are displayed. Hence, the user can erase a displayed image only by determining that the image is to be erased immediately. Particularly in an emergent case, confusion at the user side is removed. When the user determines that the displayed image is to be erased, the corresponding data region can be immediately used for the next photographing operation.

In a searching operation in the reproducing mode, an index portion 32 is retrieved. When an index portion 32 has been found, the corresponding image data is read and displayed on the liquid-crystal monitor 29 whether erasure of the image data is prohibited or not. Upon completion of the display, the next index portion 32 is retrieved. When the next index portion 32 has been found, the corresponding image is displayed on the liquid-crystal monitor 29 in the above-described manner. On the other hand, when the next index portion 32 has not been found, the searching operation is terminated.

Figure 5A:
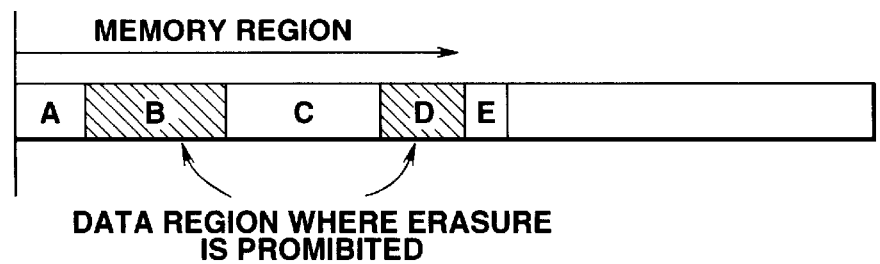
FIGS. 5A–5C are schematic diagrams illustrating searching operations.
Figure 5B:
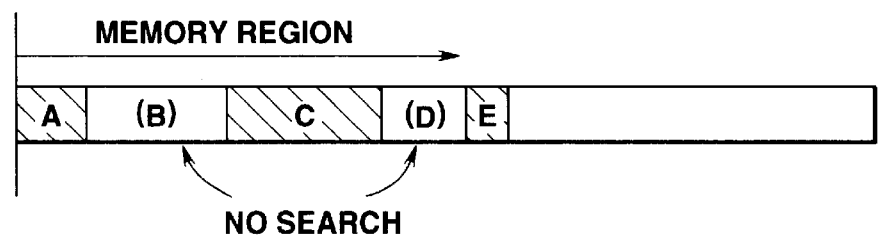
Figure 5C:
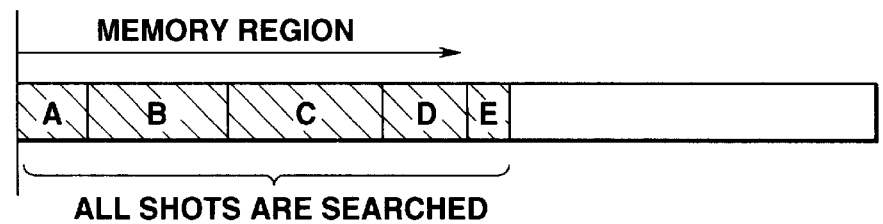

FIGS. 5A–5C are diagrams, each illustrating a searching operation. FIG. 5A illustrates a state of recording of data within the memory 25. Shots A–E are recorded in the memory 25, and the shots B and D are set to prohibition of erasure.

During a photographing operation, as shown in FIG. 5B, the shots B and D are not displayed for the user's searching operation, and only the shots A, C and E are searched and displayed on the liquid-crystal monitor 29. During a reproducing operation, as shown in FIG. 5C, all the shots A–E are searched for the user's searching operation and are displayed on the liquid-crystal monitor 29.

In a searching operation in the photographing mode, when image data is not set to prohibition of erasure, and is read and displayed on the liquid-crystal monitor 29 in step S4, the user's instruction to erase the data may be awaited, and when the user's instruction is provided, that fact may be displayed and the image data may be erased.

When a large-capacity storage device can be connected, image data may be transferred to the large-capacity storage device instead of erasing the image data.

In the first embodiment, a semiconductor memory has been illustrated as the storage medium. However, the storage medium is not limited to a semiconductor memory, but a magnetic disk, such as a hard disk, a floppy disk or the like, or a magnetooptical disk may also be used as the storage medium. Particularly, a randomly accessible storage medium, such as a semiconductor memory, a disk device or the like, is more effective for high-speed image retrieval.

Recorded images may be still images or moving images.

The present invention may be applied to a system comprising a plurality of apparatuses, or to an apparatus comprising a single unit.

The present invention may, of course, be applied to a case in which the objects of the invention are achieved by supplying a system or an apparatus with a program. In such a case, the system or the apparatus can be provided with the effects of the invention by reading the contents of a storage medium storing the program represented by software for achieving the objects of the invention into the system or the apparatus. Although in the first embodiment, the program is stored in the ROM within the microprocessor 21, the present invention is not limited to such an approach. For example, the program may be stored in a floppy disk, a hard disk, an optical disk, a magnetooptical disk, a CD(compact disc)-ROM, a CD-R (recordable), a DVD (digital video disc), a magnetic tape, a nonvolatile memory card, or the like.

According to the image recording apparatus of the first embodiment, when recording images by photographing means and recording the photographed images in a recording medium by recording means, the recorded images are retrieved by retrieval means. At that time, different retrieval operations are performed depending on operational modes. Hence, a retrieval operation corresponding to an operational mode can be performed. Particularly during a photographing operation in which moving images are recorded in a randomly accessible recording medium, it is possible to promptly retrieve unnecessary recorded data.

The same effects may also be obtained in the image recording method of the first embodiment.

According to the image recording apparatus of the first embodiment, setting means for setting prohibition of erasure for a recorded image is provided. When the operational mode is a photographing mode in which images are recorded in a recording medium, retrieval means does not retrieve images for which prohibition of erasure is set. Hence, it is possible to retrieve by a searching operation only image data regions where erasure is permitted, so that data can easily selected and abandoned during a photographing operation.

According to the image recording apparatus of the first embodiment, when the operational mode is a reproducing mode of reproducing images recorded in a recording medium, the retrieval means retrieves all images recorded in the recording medium. Hence, it is possible to easily select and abandon data during a photographing operation, and to retrieve all images during the reproducing operation.

According to the image recording apparatus of the first embodiment, the recording medium is a semiconductor memory. Hence, the present invention is effective for an image recording apparatus utilizing a semiconductor memory.

According to the image recording apparatus of the first embodiment, the recording medium is a magnetic disk or a magetooptical disk. Hence, the present invention is effective for an image recording apparatus utilizing a magnetic disk or a magnetooptical disk.

Other embodiments of the present invention will now be described.

Figure 7:
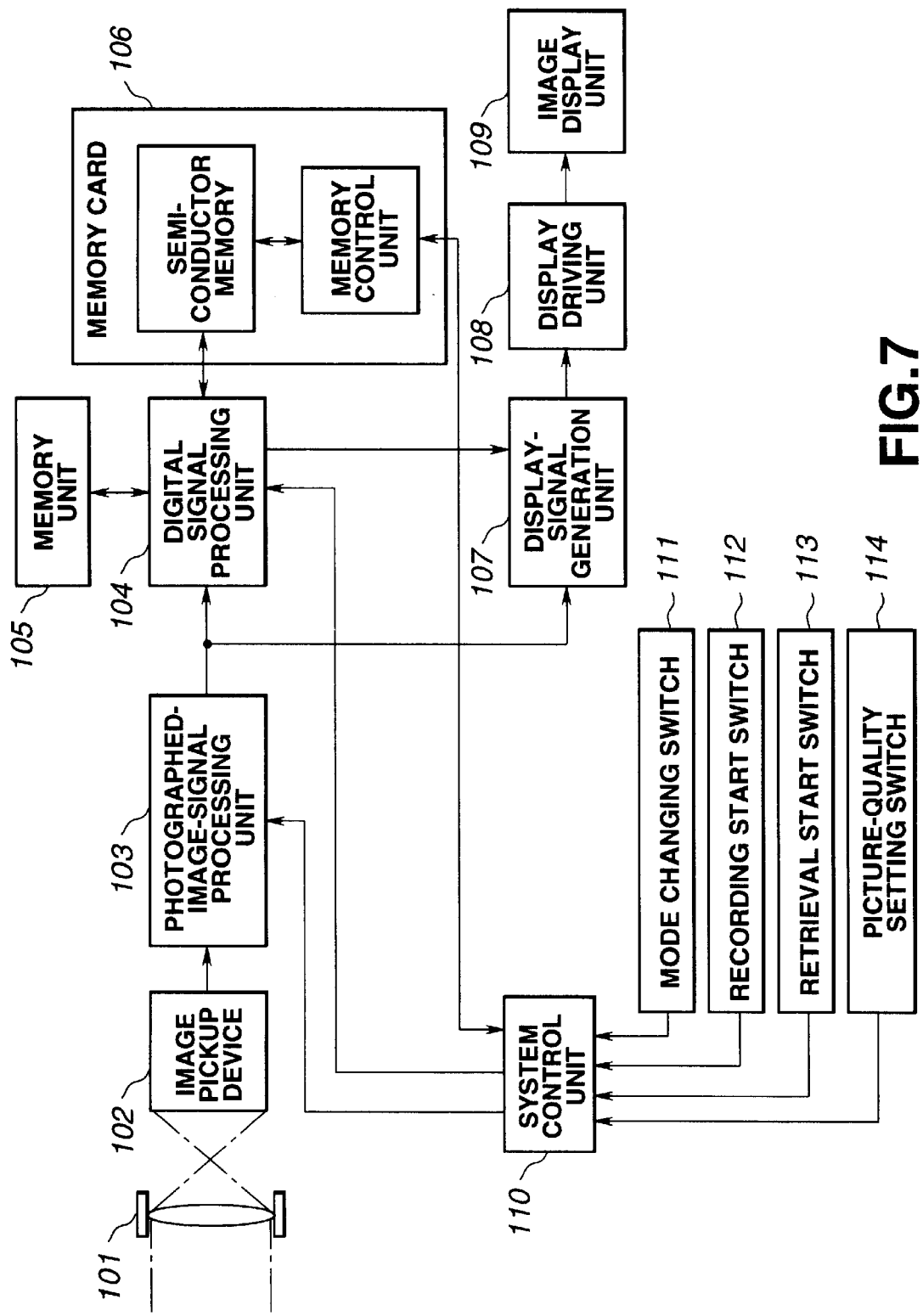
FIG. 7 is a block diagram illustrating the configuration of the digital camera shown in FIG. 6.

FIG. 6 is a schematic diagram illustrating a digital camera, serving as an image recording/reproducing apparatus according to a second embodiment of the present invention. FIG. 7 is a schematic block diagram illustrating the configuration of the digital camera shown in FIG. 6.

In FIG. 7, a photographing lens 101 photographs an image of an object. An image pickup device 102 converts the image of the object photographed by the photographing lens 101 into an electrical signal by performing photoelectric conversion. A photographed-image-signal processing unit 103 performs signal processing for the electrical signal output from the image pickup device 102 and generates a photographed-image signal. A digital signal processing unit 104 digitizes the photographed-image signal generated by the photographed-image-signal processing unit 103 and compresses the obtained digital signal, and performs expansion processing of returning the digital photographed-image signal to the original photographed-image signal during a reproducing operation. A randomly accessible memory unit 105 temporarily stores digital image data in order to realize compression/expansion processing for the digital image data by the digital signal processing unit 104. In the second embodiment, a DRAM (dynamic random access memory) is used as the memory unit 105. An image recording unit 106 records the digital image data generated by the digital signal processing unit 104 in a recording medium. In the second embodiment, a nonvolatile semicondoctor memory is used as the recording medium. As shown in FIG. 7, the image recording unit 106 has the shape of a card which is detachably mountable in the main body of the image recording/reproducing apparatus (hereinafter termed a "memory card"). The memory card 106 includes a memory unit including the nonvolatile semiconductor memory, and a memory control unit for controlling data writing, reading and erasing operations and the like in the memory unit. An image display unit 109 comprises a liquid-crystal display device or the like, and displays an image being photographed, and reproduces and displays digital image data recorded in the memory card 106. A display-signal generation unit 107 generates a display signal for displaying the photographed-image signal output from the photographed-image-signal processing unit 103 or the digital signal processing unit 104 on the display device of the image display unit 109. A display driving unit 108 drives the display device of the image display unit 109 in accordance with the display signal generated by the display-signal generation unit 107. A mode changing switch 111 is operated when the user switches between a "photographing recording mode" of recording digital image data corresponding to an image of an object being photographed in the memory card 106, and a "reproducing mode" of reading and reproducing digital image data recorded in the memory card 106. A recording start switch 112 is used for requesting the memory card 106 to start a recording operation during the photographing recording mode. A retrieval start switch 113 is used for requesting the memory card 106 to start an operation of retrieving digital image data recorded in the memory card 106 in the photographing recording mode or the reproducing mode. A picture-quality setting switch 114 is used for selectively setting the picture quality and the size of an image corresponding to digital image data to be recorded in the memory card 106. A system control unit 110, comprising a microprocessor and the like, detects input signals from the photographed-image-signal processing unit 103, the digital signal processing unit 104, the memory card 106, and operational switches, such as the mode changing switch 111, the recording start switch 112, the retrieval start switch 113, the picture-quality setting switch 114 and the like, and controls various operations.

A description will now be provided of an operation when the "photographing recording mode" is selected through the mode changing switch 111, and digital image data corresponding to a photographed image of an object is recorded in the recording medium, in the digital camera having the above-described configuration.

In the "photographing recording mode", first, an image of an object photographed by the photographing lens 101 is focused onto the imaging surface of the image pickup device 102. The image pickup device 102 forms an electrical signal by performing photoelectric conversion of the image of the object focused on the imaging surface. The photographed-image-signal processing unit 103 then forms a photographed-image signal by performing signal processing for the electrical signal, and supplies the digital signal processing unit 104 and the display-signal generation unit 107 with the formed photographed-image signal.

The display-signal generation unit 107 generates a display image signal based on the photographed-image signal supplied from the photographed-image-signal processing unit 103. The display driving unit 108 displays the image of the object being photographed on the display picture surface of the image display unit 109 by driving the image display unit 109 in accordance with the display image signal. That is, the user can select the composition of the image of the object to be finally photographed and recorded by watching the image of the object being photographed on the image display unit 109.

The user operates the recording start switch 112 by watching the image of the object displayed on the image display unit 109 in order to request the system control unit 110 to start a photographing recording operation. Then, the digital signal processing unit 104 digitizes a photographed-image signal for one picture frame supplied from the photographed-image-signal processing unit 103 and stores the obtained digital image data in the memory unit 105. After performing compression processing, such as processing conforming to "JPEG (Joint Photographic Experts Group)" or the like, for the stored digital image data, the digital signal processing unit 104 stores the resultant image data in the memory unit 105.

In the digital signal processing unit 104, by setting the picture quality of the image to be recorded when compressing the digital image data, a data compression ratio corresponding to the picture quality is automatically selected.

In the above-described compression processing, such as the processing conforming to "JPEG" or the like, the amount of image data for one picture frame is smaller and the picture quality is inferior as the compression ratio is higher. Hence, the digital camera of the second embodiment includes the picture-quality setting switch 114 for selectively setting the picture quality (for example, one of three picture quality levels, i.e., high picture quality (compression ratio of 1/5), standard picture quality (compression ratio of 1/10) and low picture quality (compresion ratio of 1/20) may be selected) and the image size (for example, one of two image sizes, i.e., a large size (640 pixels×480 pixels) and a small size (320 pixels×240 pixels), may be selected) when recording digital image data. The user selects the picture quality and the size of the image to be recorded by operating the picture-quality setting switch 114 before starting a photographing recording operation in accordance with the situation and the desire. The system control unit 110 thereby sets a compression ratio corresponding to the selected picture quality and size of the image for the digital signal processing unit 104. The digital signal processing unit 104 compresses image data digitized and stored in the memory unit 105 with the compression ratio set by the system control unit 110.

Figure 8:
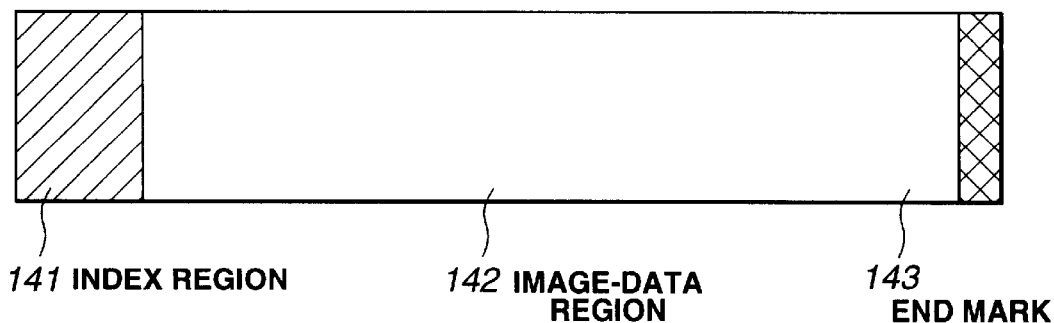
FIG. 8 is a diagram illustrating a data-string format of data recorded in a memory card.

The digital image data subjected to compression processing by the digital signal processing unit 104 in the above-described manner is read from the memory unit 105 and is recorded in the memory card 106 in a data-string format as shown in FIG. 8.

FIG. 8 is a digram illustrating the data-string format of data recorded in the memory card 106. A data-string format for digital image data for one picture frame includes an index region 141 for storing information relating to digital image data stored in the succeeding image data region 142 (hereinafter termed "index information"), an image-data region 142 for storing digital image data for one picture frame, and an end mark 143 indicating the end of the image data. The index region 141 includes, for example, information relating to an image number for discriminating a recorded image from other images (hereinafter termed a "serial number"), information relating to setting of the picture quality of image data, information relating to the image size of the image data, information relating to the date of photographing the image data, information relating to setting of permission/prohibition of erasure of the image data, and the like. After adding these information and end mark to digital image data subjected to compression processing by the digital signal processing unit 104, the entire data is recorded in the memory card 106.

Next, a description will be provided of an image retrieval operation for confirming a photographed and recorded image, and an image retrieval operation for specifying image data which may be erased from among image data recorded in the memory card 106 in order to erase unnecessary image data from the memory card 106, when the "photographing recording mode" is selected through the mode changing switch 111, with reference to the flowchart shown in FIG. 9A.

When the system control circuit 110 is instructed to start a retrieval operation by the user's operation of the retrieval start switch 113, then, in step S111, retrieval of an index region where index information added to image data recorded in the memory card 106 is stored is started. In step S112, it is determined if an index region where index information is stored has been detected. If the result of the determination in step S112 is affirmative, the process proceeds to step S113, where information relating to setting of the picture quality of image data in index information stored in the detected index region is retrieved.

In step S114, it is determined if the picture quality set in the retrieved picture-quality setting information is the same as the currently set picture quality during the photographing recording mode. If the result of the determination in step S114 is affirmative, the process proceeds to step S115. If the result of the determination in step S114 is negative, the process returns to step S111 without reading image data stored in the image-data region, and the next index information is retrieved.

In step S115, image data stored in the image data region is read, and the read image data is subjected to signal processing in a reproducing operation, such as expansion processing or the like, by the digital signal processing unit 104 to generate a photographed-image signal. The generated photographed-image signal is supplied to the display-signal generation unit 107 in order to be displayed as a reproduced image on the display picture surface of the image display unit 109.

In step S116, the user confirms the reproduced image and determines if the reproduced image is to be erased or rewritten into a new image. When the user operates an erasure permission switch (not shown), the process proceeds to an erasure operation or an operation of recording a new image, and the reproduced image is erased or held in the memory card 106 without being rewritten into a new image. When the user operates an erasure prohibition switch (not shown), the process returns to step S111, where the next index region is retrieved.

When the next index region has not been detected and all index information for image data recorded in the memory card 106 has been retrieved as the result of the determination in step S112, the retrieval operation is terminated. By repeating the above-described processing until all index information is detected, it is possible to read only image data where index information having information relating to setting of the same picture quality as the currently set picture quality in the photographing recording mode is added, and to display the read image data.

As described above, in an image retrieval operation for confirming the photographed and recorded image, or in an image retrieval operation for specifying image data which may be erased from among image data recorded in the memory card 106 in order to erase unnecessary image data from the memory card 106, in the photographing recording mode, by instantaneously retrieving, reproducing and displaying only images recorded with setting of the same picture quality as the currently set picture quality in the photographing recording mode instead of reproducing and displaying all images recorded in the memory card 106, it is possible to promptly perform an operation of confirming an image after a photographing operation, or an operation of confirming images for an erasing or rewriting operation without confusion.

Next, a description will be provided of an operation of retrieving images recorded in the memory card 106 when the "reproducing mode" is selected through the mode changing switch 111, with reference to the flowchart shown in FIG. 9B.

When the system control circuit 110 is instructed to start a retrieval operation by the user's operation of the retrieval start switch 113, then, in step S121, retrieval of an index region where index information added to image data recorded in the memory card 106 is stored is started. In step S122, it is determined if an index region where index information is stored has been detected. If the result of the determination in step S122 is affirmative, the process proceeds to step S123.

In step S123, image data stored in the image data region next to the detected index region is read, and the read image data is subjected to signal processing during a reproducing operation, such as expansion processing or the like, by the digital signal processing unit 104 to generate a photographed-image signal. The generated photographed-image signal is supplied to the display-signal generation unit 107 in order to be displayed as a reproduced image on the display picture surface of the image display unit 109.

In step S124, the user confirms the reproduced image and determines if the reproduced image is to be erased or rewritten into a new image. When the user operates an erasure permission switch (not shown), the process proceeds to an erasure operation or an operation of recording a new image, and the reproduced image is erased or held in the memory card 106 without being rewritten into a new image. When the user operates an erasure prohibition switch (not shown), the process returns to step S121, where the next index region is retrieved.

When the next index region has not been detected and all index information for image data recorded in the memory card 106 has been retrieved as the result of the determination in step S122, the retrieval operation is terminated. By repeating the above-described processing until all index information is detected, all image data recorded in the memory card 106 are read and displayed.

As described above, in an operation of retrieving images recorded in the memory card 106 during the reproducing mode, all image data recorded in the memory card 106 are sequentially reproduced and displayed irrespective of index information stored in the index region.

Figure 10A:
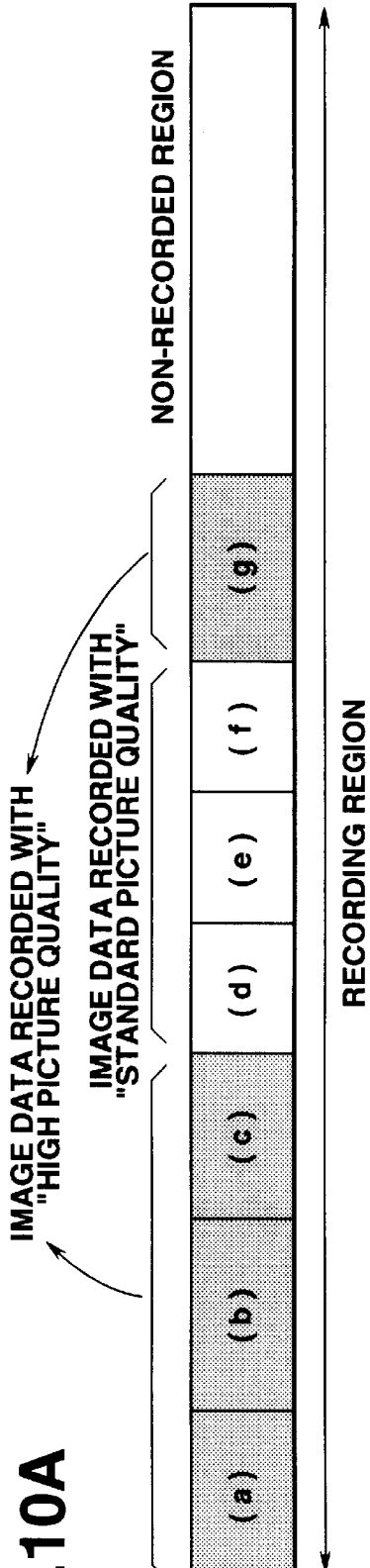
FIGS. 10A–10C are schematic diagrams, each illustrating an image retrieval operation.
Figure 10B:
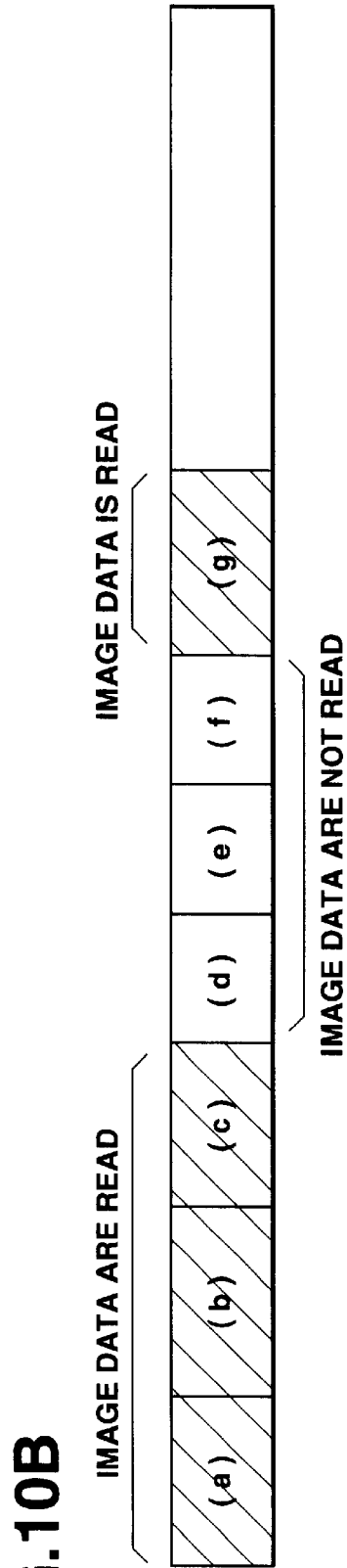
Figure 10C:
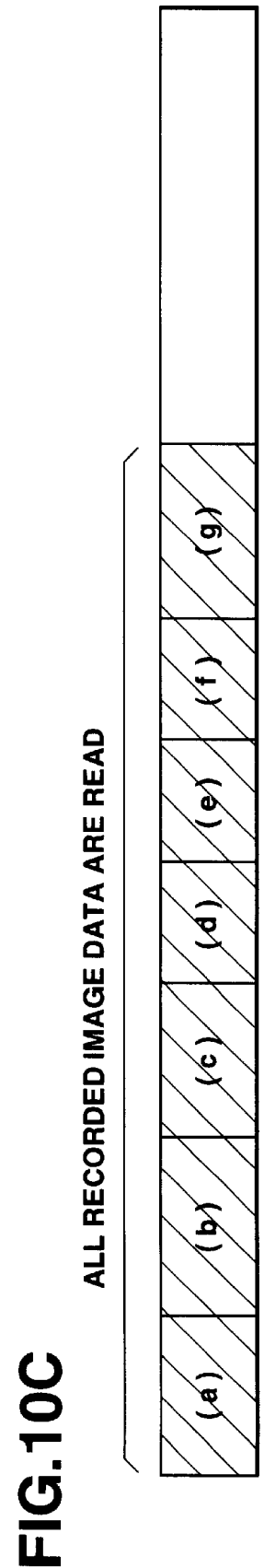

FIGS. 10A–10C are diagrams schematically illustrating the above-described retrieval operations. FIG. 10A is a diagram illustrating a state of recording of image data recorded in the memory card 106. That is, FIG. 10A shows that from among image data for seven picture frames (a)–(g), each of image data for picture frames (a), (b), (c) and (g) is subjected to a photographing recording operation by setting the picture quality to "high picture quality", and each of image data for picture frames (d), (e) and (f) is subjected to a photographing recording operation by setting the picture quality to "standard picture quality".

In this state of recording image data in the memory card 106, in a retrieval operation in the photographing recording mode, only image data for the picture frames (a), (b), (c) and (g) are retrieved and displayed when the picture quality in the current photographing recording mode is set to "high picture quality", as shown in FIG. 10B. On the other hand, in a retrieval operation in the reproducing mode, all image data for the seven picture frames (a)–(g) are retrieved and displayed, as shown in FIG. 10C.

Figure 11B:
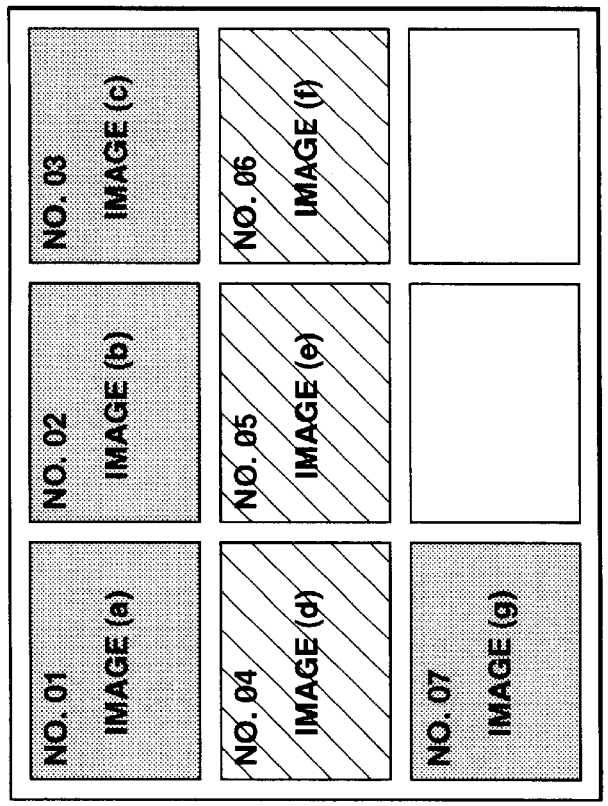
FIGS 11A and 11B are diagrams, each illustrating an example of display during a retrieval operation in a photographing recording mode.
Figure 11A:
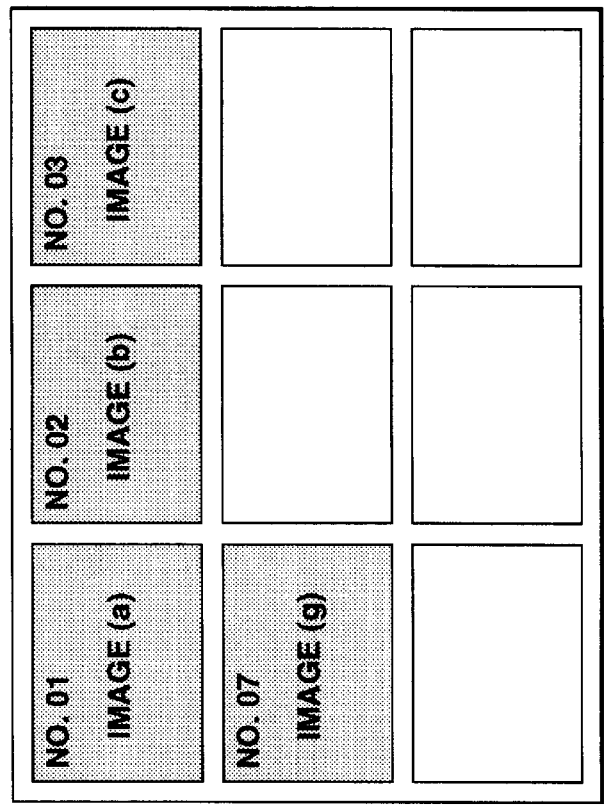

As an example of display on the image display unit 109 during a retrieval operation in the photographing recording mode, as shown in FIG. 11A, the display picture surface may be divided into a plurality of regions (9 regions in the case of FIG. 11A), and reproduced images may be sequentially displayed in respective regions by being reduced in the order of retrieving and reproducing operations. At that time, image-number information stored in the index region for each image may be read and the read image number may be displayed together with the image, as shown in FIG. 11A.

As an example of display on the image display unit 109 during a retrieval operation in the photographing recording mode, as shown in FIG. 11B, although images corresponding to image data (d), (e) and (f) for picture frames which do not coincide with the retrieval condition are not displayed, only image-number information may be displayed so that the user understands the presence of data, or monochromatic images may be displayed instead of reproduced images.

In the second embodiment, a case in which "high picture quality" is set as the picture quality in the current photographing recording mode is described. Instead, when "standard picture quality" or "low picture quality" is set, index regions where picture-quality information corresponding to the set picture quality may be retrieved, and retrieved image data may be reproduced and displayed.

Although in the foregoing description, a case in which only image data photographed and recorded with the same picture quality as the picture quality in the current photographing recording mode are read and displayed has been illustrated as the retrieval condition during the photographing recording mode, the present invention is not limited to such a case. For example, in a retrieval operation in the photographing recording mode, only images retrieved according to information relating to the date of photographing image data may be displayed. In this case, for example, a retrieving and confirming operation of "reproducing and displaying only images photographed in the same date as the date of the current photographing operation" can be promptly performed.

Alternatively, only images retrieved according to information relating to setting of permission/prohibition of erasure of image data may be displayed as the retrieval condition in the photographing recording mode. In this case, for example, a retriving and confirming operation of "reproducing and displaying only images which may be erased (i.e., images represented by image data where information relating to setting of permission of erasure is added) from among images recorded in the memory card 106 when the recording capacity of the memory card 106 becomes insufficient and unnecessary image data must be urgently erased" can be promptly and automatically performed without confusion, and unnecessary image data can be instantaneously selected and erased.

In another approach, only images retrieved according to information relating to the image size of image data may be displayed as the retrieval condition in the photographing recording mode. In this case, for example, a retrieving and confirming operation of "reading and displaying only image data photographed and recorded with setting of the same image size as the image size in the current photographing recording mode" can be promptly performed.

In each of the above-described cases, all image data recorded in the memory card 106 are read and displayed in a retrieval operation in the reproducing mode.

As described above, in the digital camera, serving as the image recording/reproducing apparatus of the second embodiment, the retrieval condition for image data in the photographing recording mode is appropriately set in accordance with the state of use, and only retrieved image data are displayed. Hence, it is possible to promptly and automatically retrieve and confirm desired image data from among many image data when it is intended to confirm recorded image data in the photographing recording mode, and to promptly retrieve and confirm only image data which may be erased from among image data recorded in the recording medium, and to instataneously select and erase unnecessary image data which may be erased, when the recording capacity of the recording medium becomes insufficient and unnecessary image data must be urgently erased in the photographing recording mode.

Next, a third embodiment of the present invention will be described. In the second embodiment, a digital camera which uses a detachably mountable card-shaped unit for recording data in a semiconductor memory as an image recording unit has been illustrated as an example of image recording/reproducing apparatus according to the present invention. In the third embodiment, however, as shown in FIG. 12, a digital camera which uses a unit for recording data in an optical disk as an image recording unit will be described as an example of the image recording/reproducing apparatus according to the present invention.

Figure 12:
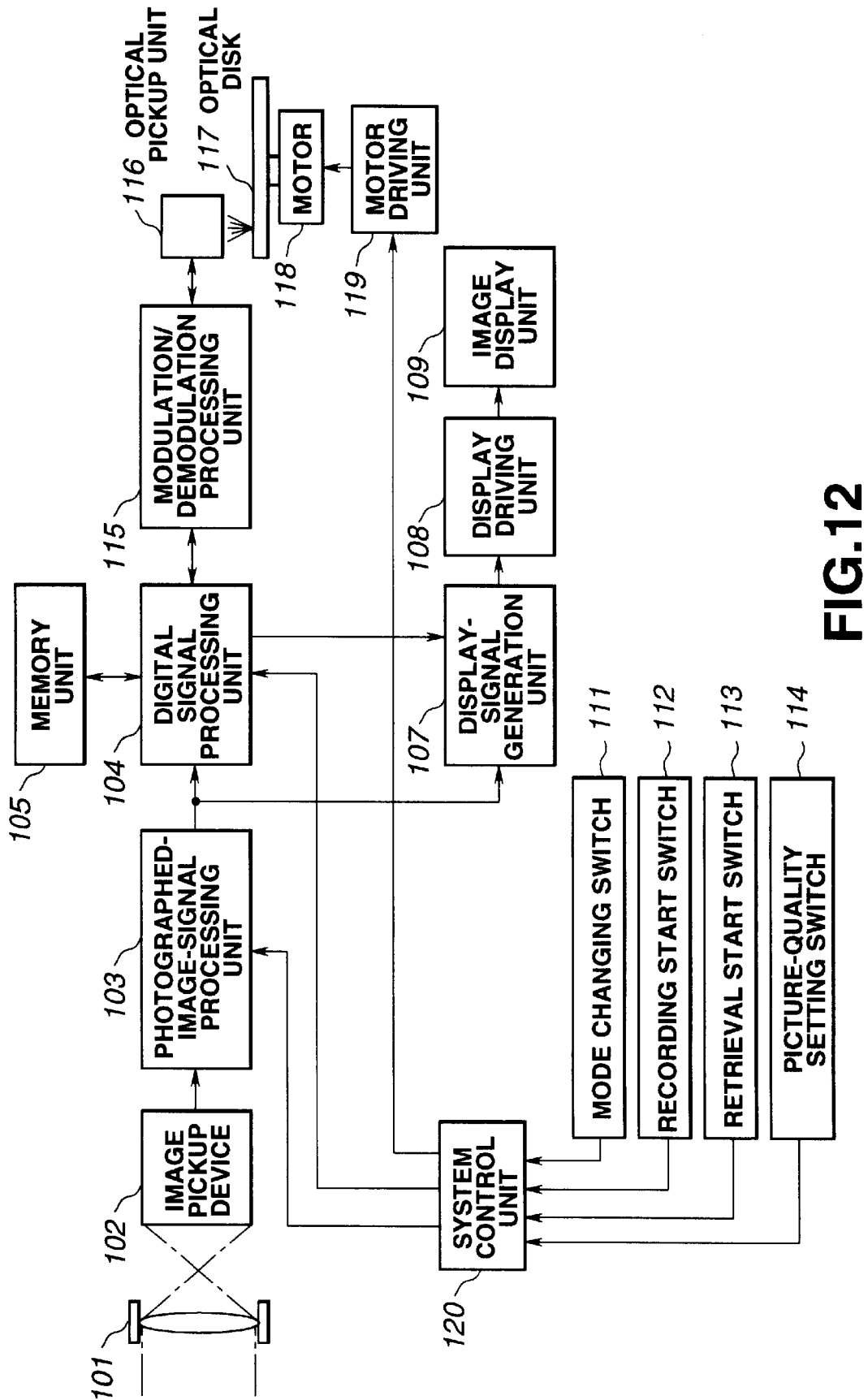
FIG. 12 is a schematic diagram illustrating the configuration of a digital camera, serving as an image recording/reproducing apparatus according to a third embodiment of the present invention.

FIG. 12 is a schematic diagram illustrating the configuration of the digital camera, serving as the image recording/reproducing apparatus of the third embodiment. In FIG. 12, the same components as those having the same functions as in the second embodiment shown in FIG. 7 are indicated by the same reference numerals, and further description thereof will be omitted.

In FIG. 12, a modulation/demodulation processing unit 115 performs modulation processing for digital image data generated by a digital signal processing unit 104 during a recording operation in order to record the digital image data in an optical disk 117, serving as a recording medium, and also performs demodulation processing of returning data reproduced from the optical disk 117 during a reproducing operation to the original digital image data. An optical pickup unit 116 includes a laser-beam emitting unit and a reflected-beam sensing unit for recording data in and reproducing data from, respectively, the optical disk 117. The optical disk 117 is a phase-change-type disk. A motor 118 rotates the optical disk 117. A motor driving unit 119 drives the motor 118. A system control unit 120 comprises a microprocessor and the like, and controls a photographed-image-signal processing unit 103, the digital signal processing unit 104, and recording/reproducing operations with respect to the optical disk 117. The system control unit 120 also detects input signals from operational switches, such as a mode changing switch 111, a recording start switch 112, a retrieval start switch 113, a picture-quality setting switch 114 and the like, and controls various operations. Although in the third embodiment, a phase-change-type optical disk is used, the present invention is not limited to such a disk, but may also use any other optical disk, such as a magnetooptical disk or the like.

A description will now be provided of an operation when the "photographing recording mode" is selected through the mode changing switch 111, and digital image data corresponding to a photographed image of an object is recorded in the optical disk 117 in the digital camera having the above-described configuration.

In order to record digital image data generated by the digital signal processing unit 104 in the optical disk 117, the digital image data is subjected to modulation processing by the modulation/demodulation processing unit 115, and a laser beam emitted from the laser-beam emission unit of the optical pickup unit 116 performs recording in the optical disk 117 in accordance with the data subjected to the modulation processing.

By recording data coaxially along the circumference of the optical disk 117 rotating at a high speed, a data recording pattern as schematically shown in FIG. 13A is formed. As shown in FIG. 13B, the data-string format of image data for each picture frame includes an index region 141, an image-data region 142 and an end mark 143 in the same manner as in the second embodiment shown in FIG. 8. Digital image data for one picture frame having such a data-string format is recorded in the optical disk 117.

Next, a description will be provided of an image retrieval operation for confirming a photographed and recorded image, and an image retrieval operation for specifying image data which may be erased from among image data recorded in the optical disk 117 in order to erase unnecessary image data from the optical disk 117, when the "photographing recording mode" is selected through the mode changing switch 111, with reference to the flowchart shown in FIG. 9A.

When the system control circuit 120 is instructed to start a retrieval operation by the user's operation of the retrieval start switch 113, the system control unit 120 causes the optical disk 117 to rotate at a high speed using the motor 118 and the motor driving unit 119 in order to read data recorded in the optical disk 117, and causes the laser-beam emitting unit of the optical pickup 116 to emit a laser beam toward the optical disk 117. The beam reflected from the optical disk 117 is sensed by the beam sensing unit of the optical pickup unit 116. The sensed data is sujected to demodulation processing by the modulation/demodulation processing unit 115 to be restored to the original digital image data.

In step S111, retrieval of an index region where index information added to digital image data reproduced from the optical disk 117 in the above-described manner is started. In step S112, it is determined if an index region where index information is stored has been detected. If the result of the determination in step S112 is affirmative, the process proceeds to step S113, where information relating to setting of the picture quality of image data in index information stored in the detected index region is retrieved.

In step S114, it is determined if the picture quality set in the retrieved information is the same as the currently set picture quality in the photographing recording mode. If the result of the determination in step S114 is affirmative, the process proceeds to step S115. If the result of the determination in step S114 is negative, the process returns to step S111 without reading image data stored in the image-data region, and the next index information is retrieved.

In step S115, image data stored in the image data region is read, and the read image data is subjected to signal processing during a reproducing operation, such as expansion processing or the like, by the digital signal processing unit 104 to generate a photographed-image signal. The generated photographed-image signal is supplied to the display-signal generation unit 107. In an image display unit 109, the display picture surface is divided into a plurality of regions as shown in FIGS. 11A and 11B, and reproduced images are sequentially displayed in respective regions by being reduced in the order of retrieving and reproducing operations.

In step S116, the user confirms the reproduced image and determines if the reproduced image is to be erased or rewritten into a new image. When the user operates an erasure permission switch (not shown), the process proceeds to an erasure operation or an operation of recording a new image, and the reproduced image is erased or held in the optical disk 117 without being rewritten into a new image. When the user operates an erasure prohibition switch (not shown), the process returns to step S111, where the next index region is retrieved.

When the next index region has not been detected and all index information for image data recorded in the optical disk 117 has been retrieved as the result of the determination in step S112, the retrieval operation is terminated. By repeating the above-described processing until all index information is detected, it is possible to read only image data where index information having information relating to setting of the same picture quality as the currently set picture quality in the photographing recording mode is added from among image data recorded in the optical disk 117, and to display the read image data.

As described above, in an image retrieval operation for confirming the photogrphed and recorded image, or in an image retrieval operation for specifying image data which may be erased from among image data recorded in the optical disk 117 in order to erase unnecessary image data from the optical disk 117, by instantaneously retrieving, reproducing and displaying only images recorded with setting of the same picture quality as the currently set picture quality in the photographing recording mode instead of reproducing and displaying all images recorded in the optical disk 117, it is possible to promptly perform an operation of confirming images after a photographing operation, or an operation of confirming an image for an erasing or rewriting operation without confusion.

Next, a description will be provided of an operation of retrieving images recorded in the optical disk 117 when the "reproducing mode" is selected through the mode changing switch 111, with reference to the flowchart shown in FIG. 9B.

When the system control circuit 120 is instructed to start a retrieval operation by the user's operation of the retrieval start switch 113, then, in step S121, retrieval of an index region where index information added to image data recorded in the optical disk 117 is stored is started. In step S122, it is determined if an index region where index information is stored has been detected. If the result of the determination in step S122 is affirmative, the process proceeds to step S123.

In step S123, image data stored in the image data region next to the detected index region is read, and the read image data is subjected to signal processing during a reproducing operation, such as expansion processing or the like, by the digital signal processing unit 104 to generate a photographed-image signal. The generated photographed-image signal is supplied to the display-signal generation unit 107 in order to be displayed as a reproduced image on the display picture surface of the image display unit 109.

In step S124, the user confirms the reproduced image and determines if the reproduced image is to be erased or rewritten into a new image. When the user operates an erasure permission switch (not shown), the process proceeds to an erasure operation or an operation of recording a new image, and the reproduced image is erased or held in the optical disk 117 without being rewritten into a new image. When the user operates an erasure prohibition switch (not shown), the process returns to step S121, where the next index region is retrieved.

When the next index region has not been detected and all index information for image data recorded in the optical disk 117 has been retrieved as the result of the determination in step S122, the retrieval operation is terminated. By repeating the above-described processing until all index information is detected, all image data recorded in the optical disk 117 are read and displayed.

As described above, in an operation of retrieving images recorded in the optical disk 117 in the reproducing mode, all image data recorded in the optical disk 117 are sequentially reproduced and displayed irrespective of index information stored in the index region.

Although in the foregoing description, a case in which only image data photographed and recorded with the same picture quality as the picture quality in the current photographing recording mode are read and displayed has been illustrated as the retrieval condition in the photographing recording mode, the present invention is not limited to such a case. For example, as in the second embodiment, in a retrieval operation in the reproducing mode, all images recorded in the optical disk 117 may be displayed. On the other hand, in a retrieval operation in the photographing recording mode, only images retrieved according to information relating to the date of photographing image data may be displayed, or only images retrieved according to information relating to setting of permission/prohibition of erasure of image data may be displayed, or only images retrieved according to information relating to the image size of image data may be displayed.

The data recording pattern and the data-string format of the optical disk 117 are not limited to those shown in FIGS. 13A and 13B, respectively. For example, data may be recorded as shown in FIGS. 14A–14C.

As shown in FIG. 14A, the recording region on the optical disk 117 is divided into a recording region (a) for image data and a recording region (b) for retrieval data. As shown in FIG. 14B, image data of an image for one picture frame includes an image-number-data region for recording image-number data indicating an image number corresponding to the image data, an image-data region for recording the image data, and an end mark for indicating the end of the data string, and only the image data is recorded in the recording region (a) for image data. As shown in FIG. 14C, retrieval data of an image for one picture frame includes an image-number-data rgion for recording image-number data indicating an image number corresponding to the image data, an index-data region for recording index information, such as information relating to setting of the picture quality, information relating to the size of the image, information relating to the date of the photographing operation, information relating to setting of permission/prohibition of erasure, and the like, and an end mark for indicating the end of the data string. Only the retrieval data is recorded in the recording region (b) for retrieval data.

When data are recorded in the optical disk 117 in the above-described manner, in a retrieval operation in the photographing recording mode, first, index information recorded in the recording region (b) for retrieval data shown in FIG. 14A is retrieved, image-number information corresponding to index information satisfying the retrieval condition is sequentially read, and the read image-number information is sequentially stored in the system control unit 120. When the retrieval of retrieval data recorded in the recording region (b) for retrieval data has been completed, image data recorded in the recording region (a) for image data is read in accordance with the image-number information corresponding to the index information satisfying the retrieval condition stored in the system control unit 120. It is thereby possible to perform a retrieval operation more promptly.

As described above, in the digital camera, serving as the image recording/reproducing apparatus of the third embodiment, the retrieval condition for image data in the photographing recording mode is appropriately set in accordance with the state of use, and only retrieved image data are displayed. Hence, it is possible to promptly and automatically retrieve and confirm desired image data from among many image data when it is intended to confirm recorded image data in the photographing recording mode, and to promptly retrieve and confirm only image data which may be erased from among image data recorded in an optical disk, serving as a recording medium, and to instataneously select and erase unnecessary image data which may be erased, when the recording capacity of the optical disk becomes insufficient and unnecessary image data must be urgently erased in the photographing recording mode.

In the second and third embodiments, a case of a recording/reproducing operation of still images in a digital camera has been illustrated. However, the present invention may also be applied to a recording/reproducing operation of moving images, and the same effects as in the second and third embodiment may be obtained.

As described above, according to the image recording apparatus and method of the second and third embodiments, when photographing images and recording the photographed images in a recording medium, by providing a plurality of different kinds of retrieval conditions corresponding to operational modes of the apparatus, selecting one of the retrieval conditions in accordance with the operational mode of the apparatus, and allowing to retrieve images recorded in the recording medium in accordance with the selected retrieval condition, it is possible to promptly retrieve a desired image from among recorded images in accordance with the state of use of the apparatus.

According to the image recording apparatus of the second and third embodiments, by providing image display means for displaying an image being photographed by image pickup means or an image recorded by image recording means, and displaying an image retrieved by retrieval means on the image display means, it is possible to promptly retrieve a desired image from among recorded images and confirm the contents of the image in accordance with the state of use of the apparatus.

According to the image recording apparatus of the second and third embodiments, by recording a plurality of kinds of additional information, such as image-number information for discriminating an image from other images, information relating to setting of the picture quality of image data, information relating to the size of the image data, information relating to the date of photographing the image data, information relating to setting of permission/prohibition of erasure of the image data, and the like, in a recording medium, together with the image data by image recording means, and setting a retrieval condition based on at least one kind of additional information from among the plurality of kinds of additional information in accordance with the operational mode of the apparatus and retrieving images recorded by the image recording means in accordance with the set retrieval condition by retrieval means, it is possible to promptly retrieve a desired image in accordance with the retrieval condition set based on the additional information from among recorded images in accordance with the state of use of the apparatus.

According to the image recording apparatus of the second and third embodiments, when the operational mode of the apparatus is set to a photographing recording mode of recording photographed images in a recording medium, retrieval means is allowed to retrieve images recorded in the recording medium in accordance with a retrieval condition set so as to correspond to the photographing recording mode. When a reproducing mode of reproducing an image recorded in the recording medium is set, the retrieval means is allowed to retrieve all images recorded in the recording medium without setting a retrieval condition. As a result, when it is intended to confirm recorded image data in the photographing recording mode, a desired image can be promptly and automatically retrieved and confirmed from among many image data. Particularly when the recording capacity of the recording medium becomes insufficient and unnecessary image data must be urgently erased in the photographing recording mode, it is possible to promptly retrieve and confirm only image data which may be erased from among image data recorded in the recording medium, and to instantaneously select and erase unnecessary image data which may be erased.

According to the image recording apparatus of the second and third embodiments, image recording means has a plurality of kinds of picture quality which can be set when recording photographed images in a recording medium, and information indicating the picture quality set when a photographed image is recorded in the recording medium is set as information relating to setting of the picture quality of image data. As a result, it is possible to promptly retrieve a desired image in accordance with a retrieval condition set when recording the image in the recording medium from among recorded images.

According to the image recording apparatus of the second and third embodiment, when the operational mode of the apparatus is set to a photographing recording mode of recording photographed images in a recording medium, retrieval means is allowed to retrieve images recorded with setting of the same picture quality as the picture quality indicated by information relating to setting of the picture quality set in the current photographing recording mode from among images recorded in the recording medium, in accordance with the retrieval condition set so as to correspond to information relating to setting of the picture quality of image data set in the current photographing recording mode. Hence, it is possible to promptly retrieve images recorded with setting of the same picture quality as the picture quality set when recording the images in the recording medium from among recorded images.

In the image recording apparatus of the second and third embodiments, image recording means uses one of a semiconductor memory, a magnetic disk, an optical disk and the like as a recording medium. As a result, in an image recording apparatus which uses one of a semiconductor memory, a magnetic disk, an optical disk and the like as a recording medium, a desired image can be promptly retrieved from among recorded images in accordance with the state of use of the apparatus.

The individual components shown in outline or designated by blocks in the drawings are all well known in the image recording apparatus and method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image recording apparatus for photographing images and recording the photographed images in a recording medium, said apparatus comprising:

image pickup means for picking up images;

image recording means for recording the images picked up by said image pickup means in a recording medium;

retrieval means for performing a plurality of different kinds of retrieval operations in accordance with operational modes of said apparatus for the images recorded in the recording medium by said image recording means; and setting means for setting prohibition of erasure for images recorded in the recording medium, wherein said retrieval means does not retrieve images for which prohibition of erasure has been set by said setting means, when an operational mode of said apparatus is a photographing recording mode of recording images in the recording medium.

2. An apparatus according to claim 1, wherein said retrieval means retrieves all images recorded in the recording medium, when the operational mode of said apparatus is a reproducing mode of reproducing images recorded in the recording medium.

3. An apparatus according to claim 1, wherein the recording medium includes a semiconductor memory.

4. An apparatus according to claim 1, wherein the recording medium includes a magnetic disk or a magnetooptical disk.

5. An image recording method for photographing images and recording the photographed images in a recording medium, said method comprising:

an operational mode setting step of setting an operational mode of an image recording apparatus; and a retrieval step of performing different retrieval operations in accordance with the operational mode set in said operational mode setting step when retrieving images recorded in a recording medium, wherein, when the operational mode is set to a photographing recording mode of recording picked up images in the recording medium, said retrieval step retrieves images recorded in the recording medium in accordance with a retrieval condition set so as to correspond to the photographing recording mode, and wherein, when a reproducing mode of reproducing images recorded in the recording medium is set, said retrieval step retrieves all images recorded in the recording medium without setting a retrieval condition in said retrieval step.

6. An image recording apparatus for photographing images and recording the photographed images in a recording medium, said apparatus comprising:

image pickup means for picking up images;

image recording means for recording the images picked up by said image pickup means in a recording medium; and retrieval means, having a plurality of different kinds of retrieval conditions corresponding to respective operational modes of said apparatus, for selecting one of the plurality of retrieval conditions in accordance with an operational mode of said apparatus and for retrieving images recorded by said image recording means in accordance with the selected retrieval condition, wherein, when the operational mode of said apparatus is set to a photographing recording mode of recording picked up images in the recording medium, said retrieval means retrieves images recorded in the recording medium in accordance with a retrieval condition set so as to correspond to the photographing recording mode, and wherein, when the operational mode of said apparatus is set to a reproducing mode of reproducing images recorded in the recording medium, said retrieval means retrieves all images recorded in the recording medium without setting a retrieval condition by said retrieval means.

7. An apparatus according to claim 6, further comprising image display means for displaying an image being picked up by said image pickup means or an image recorded by said image recording means, wherein said apparatus displays an image retrieved by said retrieval means on said image display means.

8. An apparatus according to claim 6, wherein said image recording means records a plurality of kinds of additional information which includes at least one of information relating to an image number for discriminating an image from other images, information relating to setting of picture quality of recorded image data, information relating to an image size of the image data, information relating to a date of photographing the image data, and information relating to setting of permission/prohibition of erasure of the image data, corresponding to the image data recorded in the recording medium, together with the image data recorded in the recording medium, and wherein said retrieval means sets a retrieval condition based on at least one of the plurality of kinds of additional information so as to correspond to the operational mode of said apparatus, and retrieves images recorded by said image recording means in accordance with the set retrieval condition.

9. An apparatus according to claim 6, wherein said image recording means uses one of a semiconductor memory, a magnetic disk, and an optical disk as the recording medium.

10. An image recording apparatus for photographing images and recording the photographed images in a recording medium, said apparatus comprising:

image pickup means for picking up images;

image recording means for recording the images picked up by said image pickup means in a recording medium; and retrieval means, having a plurality of different kinds of retrieval conditions corresponding to respective operational modes of said apparatus, for selecting one of the plurality of retrieval conditions in accordance with an operational mode of said apparatus and for retrieving images recorded by said image recording means in accordance with the selected retrieval condition, wherein said image recording means has a plurality of kinds of picture quality which can be set when recording picked up images in the recording medium, and sets information indicating picture quality set when recording a picked up image in the recording medium as information relating to setting of picture quality of the image data, and wherein, when the operational mode of said apparatus is set to a photographing recording mode of recording photographed images in the recording medium, said apparatus allows said retrieval means to retrieve images recorded with the same picture quality as picture quality indicated by information relating to setting of picture quality of image data set in the current photographing recording mode from among images recorded in the recording medium, in accordance with the retrieval condition set so as to correspond to the information relating to setting of picture quality of image data set in the current photographing recording mode.

11. An apparatus according to claim 10, further comprising image display means for displaying an image being picked up by said image pickup means or an image recorded by said image recording means, wherein said apparatus displays an image retrieved by said retrieval means on said image display means.

12. An apparatus according to claim 10, wherein said image recording means records a plurality of kinds of additional information which includes at least one of information relating to an image number for discriminating an image from other images, information relating to setting of picture quality of recorded image data, information relating to an image size of the image data, information relating to a date of photographing the image data, and information relating to setting of permission/prohibition of erasure of the image data, corresponding to the image data recorded in the recording medium, together with the image data recorded in the recording medium, and wherein said retrieval means sets a retrieval condition based on at least one of the plurality of kinds of additional information so as to correspond to the operational mode of said apparatus, and retrieves images recorded by said image recording means in accordance with the set retrieval condition.

13. An apparatus according to claim 10, wherein said image recording means uses one of a semiconductor memory, a magnetic disk, an optical disk as the recording medium.

14. An image recording method for photographing images and recording the photographed images in a recording medium, said method comprising:

a selection step, having different kinds of retrieval conditions corresponding to respective operational modes of an image recording apparatus, of selecting one of the plurality of kinds of retrieval conditions in accordance with an operational mode of the apparatus; and a retrieval step of allowing retrieval of images recorded in a recording medium in accordance with the retrieval condition selected in said selection step, wherein, when the operational mode is set to a photographing recording mode of recording picked up images in the recording medium, said retrieval step retrieves images recorded in the recording medium in accordance with a retrieval condition set so as to correspond to the photographing recording mode, and wherein, when an operational mode is set to a reproducing mode of reproducing images recorded in the recording medium, said retrieval step retrieves all images recorded in the recording medium without setting a retrieval condition in said retrieval step.

15. An image recording method for photographing images and recording the photographed images in a recording medium, said method comprising:

an image pickup step of picking up images;

an image recording step of recording the images picked up in said image pickup step in a recording medium; and a retrieval step of performing a plurality of different kinds of retrieval operations in accordance with operational modes for the images recorded in the recording medium in said image recording step; and a setting step of setting prohibition of erasure for the images recorded in the recording medium, wherein said retrieval step does not retrieve images for which prohibition of erasure has been set in said setting step, when an operational mode is a photographing recording mode of recording images in the recording medium.

16. An image recording method for photographing images and recording the photographed images in a recording medium, said method comprising:

an image pickup step of picking up images;

an image recording step of recording the images picked in said image pickup step in a recording medium; and a retrieval step having a plurality of different kinds of retrieval conditions corresponding to respective operational modes for selecting one of the plurality of retrieval conditions in accordance with an operational mode and retrieving images recorded in said image recording step in accordance with the selected retrieval condition, wherein, when the operational mode is set to a photographing recording mode of recording picked up images in the recording medium, said retrieval step retrieves images recorded in the recording medium in accordance with a retrieval condition set so as to correspond to the photographing recording mode, and wherein, when a reproducing mode of reproducing images recorded in the recording medium is set, said retrieval step retrieves all images recorded in the recording medium without setting a retrieval condition in said retrieval step.

17. An image recording method for photographing images and recording the photographed images in a recording medium, said method comprising:

an image pickup step of picking up images;

an image recording step of recording the images picked up in said image pickup step in a recording medium; and a retrieval step, having a plurality of different kinds of retrieval conditions corresponding to respective operational modes, for selecting one of the plurality of retrieval conditions in accordance with an operational mode and for retrieving images recorded by said image recording means in accordance with the selected retrieval condition, wherein said image recording step has a plurality of kinds of picture quality which can be set when recording picked up images in the recording medium, and sets information indicating picture quality set when recording a picked up image in the recording medium as information relating to setting of picture quality of the image data, and wherein, when the operational mode is set to a photographing recording mode of recording photographed images in the recording medium, said retrieval step allows retrieval of images recorded with the same picture quality as picture quality indicated by information relating to setting of picture quality of image data set in the current photographing recording mode from among images recorded in the recording medium, in accordance with the retrieval condition set so as to correspond to the information relating to setting of picture quality of image data set in the current photographing recording mode.

* * * * *

UNITED STATES PATENT AND TRADEMARK OFFICE
CERTIFICATE OF CORRECTION

PATENT NO. : 6,674,468 B1
DATED : January 6, 2004
INVENTOR(S) : Hiroshi Hosoe et al.

It is certified that error appears in the above-identified patent and that said Letters Patent is hereby corrected as shown below:

Drawings,
Sheet No. 2, Figure 2, "SYNTHESUS" should read -- SYNTHESIS --.

Column 3,
Line 44, "FIG." should read -- FIG. 1; --.

Column 4,
Line 38, "switch." should read -- switch --.

Column 7,
Line 13, "can" should read -- can be --.
Line 29, "magetooptical" should read -- magnetooptical --.

Column 16,
Line 45, "rgion" should read -- region --.

Signed and Sealed this

Twenty-ninth Day of June, 2004

JON W. DUDAS
*Acting Director of the United States Patent and Trademark Office*